(12) United States Patent
Iwai

(10) Patent No.: US 7,072,174 B2
(45) Date of Patent: Jul. 4, 2006

(54) TELEVISION TUNER AND HOUSING STRUCTURE FOR ELECTRONIC EQUIPMENT

(75) Inventor: Takeo Iwai, Osaka (JP)

(73) Assignee: Funai Electric Co. Ltd., Osaka (JP)

( * ) Notice: Subject to any disclaimer, the term of this patent is extended or adjusted under 35 U.S.C. 154(b) by 0 days.

(21) Appl. No.: 10/875,358

(22) Filed: Jun. 24, 2004

(65) Prior Publication Data

US 2004/0263292 A1 Dec. 30, 2004

(30) Foreign Application Priority Data

Jun. 25, 2003 (JP) .............................. 2003-003754

(51) Int. Cl.
*H05K 5/00* (2006.01)

(52) U.S. Cl. ................. 361/679; 361/753; 361/799; 361/816; 361/818; 334/85; 174/35 GC; 174/35 R; 312/223.2

(58) Field of Classification Search ................ 361/679, 361/682, 724–727, 600, 728–802, 816, 818, 361/723; 348/553–570; 174/35 R, 35 GC; 334/85

See application file for complete search history.

(56) References Cited

U.S. PATENT DOCUMENTS 6,469,904 B1 * 10/2002 Vigeant et al. ............. 361/752
6,665,178 B1 * 12/2003 Curlee et al. ............... 361/687
6,837,554 B1 * 1/2005 Yamamoto et al. ......... 312/223.2

FOREIGN PATENT DOCUMENTS

| JP | 58-155872 | 10/1983 |
|---|---|---|
| JP | 6-291483 | 10/1994 |

OTHER PUBLICATIONS

Concise Statement of Relevancy Between The Invention and Materials (1 page).
Patent Abstracts of Japan, Publication No.: 06-291483, Date of Publication: Oct. 18, 1994 (1 page).

* cited by examiner

*Primary Examiner*—Lynn Feild
*Assistant Examiner*—Zachary Pape
(74) *Attorney, Agent, or Firm*—Osha Liang LLP

(57) ABSTRACT

A television tuner has a bottom chassis, a top cover and a front panel, the bottom chassis having support surfaces provided on an upper portion of a front side of the bottom chassis to extend with a rising slope in a direction from a front side toward a rear side thereof, a plurality of semi-spherical projections formed on the support surfaces, a plurality of substantially U-shaped notches provided on the support surfaces, and the top cover having a convex-shaped portion to abut against the semi-spherical projections on the bottom chassis and to project toward the semi-spherical projections to function as a reinforcement rib, and hook-shaped engagements to engage with an upper portion of an inner surface of the front panel from under.

5 Claims, 6 Drawing Sheets

PRIOR ART

FIG. 13

PRIOR ART

TELEVISION TUNER AND HOUSING STRUCTURE FOR ELECTRONIC EQUIPMENT

BACKGROUND OF THE INVENTION

1. Field of the Invention

The present invention relates to a television tuner and a housing structure for an electronic equipment, and more particularly, to a television tuner, which receives therein a television tuner circuit and electronic parts that radiate electromagnetic wave noise, and a housing structure for an electronic equipment.

2. Description of the Related Art

Conventionally, an electronic equipment is known, in which electronic parts that radiate electromagnetic wave noise are received. In order to prevent leakage of electromagnetic wave noise, a housing for such electronic equipment is formed from a conductive material and configured to cover electronic parts. Also, a television tuner is conventionally known, in which a television tuner circuit that radiate electromagnetic wave noise is received.

Figure 11:
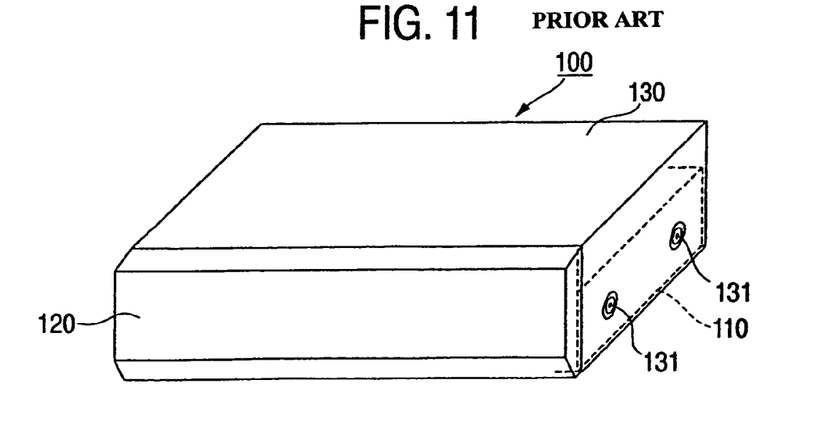
FIG. 11 is a perspective view showing a conventional television tuner.
Figure 12:
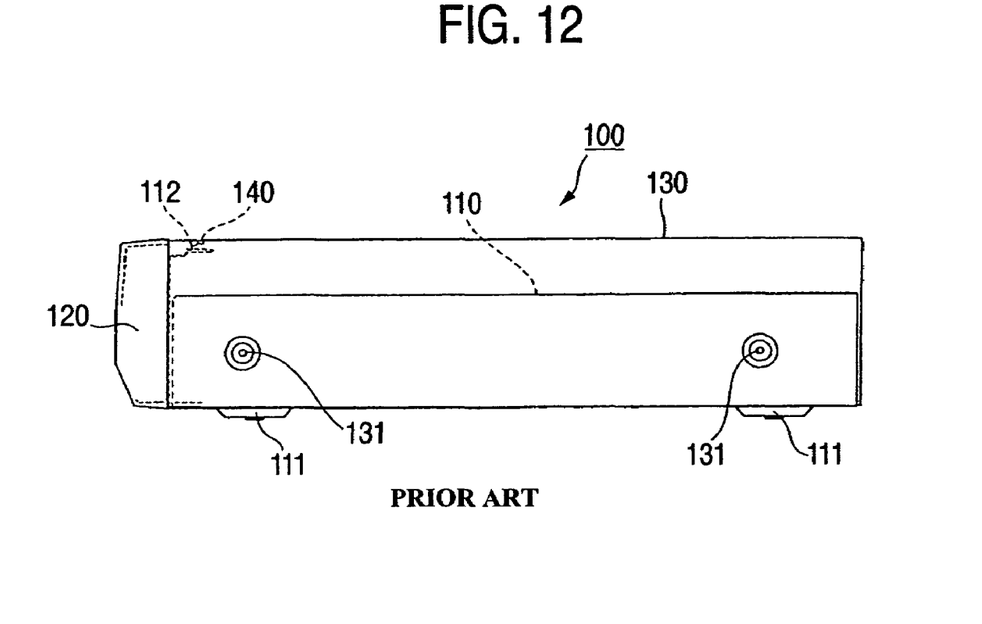
FIG. 12 is a side view showing the conventional television tuner shown in FIG. 11.
Figure 13:
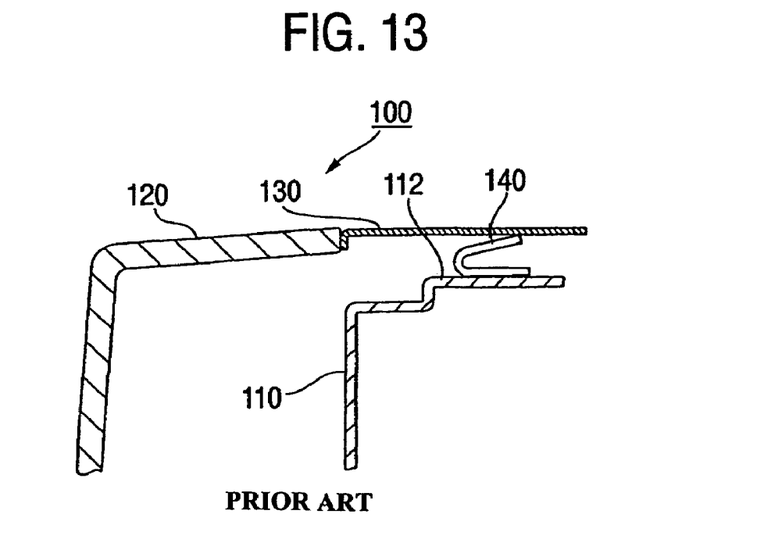
FIG. 13 is a partial cross sectional view showing the conventional television tuner shown in FIG. 12.

FIG. 11 is a perspective view showing a conventional television tuner. FIG. 12 is a side view showing the conventional television tuner shown in FIG. 11. FIG. 13 is a partial cross sectional view showing the conventional television tuner shown in FIG. 12. A construction of a conventional television tuner 100 will be described with reference to FIGS. 11 to 13.

The conventional television tuner 100 comprises, as shown in FIGS. 11 to 13, a metallic bottom chassis 110, in which an electronic equipment is received, a front panel 120 made of a resin and mounted to a front side of the bottom chassis 110, a metallic top cover 130 mounted to an upper side of the bottom chassis 110, and a metallic grounding spring 140. As shown in FIGS. 12 and 13, the bottom chassis 110 comprises legs 111 and a support surface 112. Also, the top cover 130 comprises screwing portions 131.

The conventional television tuner 100 is placed on a placing surface through the legs 111 provided on the bottom chassis 110 in such a manner that the front panel 120 faces a front side. In this case, any portions as screwed are not present on the front side in order to make an outward appearance favorable. Also, the bottom chassis 110 and the top cover 130 on the conventional television tuner 100 are screwed to each other through the screwing portions 131, which are provided on sides and a rear surface side of the top cover 130, by means of conductive screws. Thus, since the bottom chassis 110 and the top cover 130 on the conventional television tuner 100 are screwed to each other by means of conductive screws, electric points of contact are present on the sides and the rear surface side. Thereby, a shielding effect is produced on the sides and the rear surface side of the television tuner 100.

Meanwhile, since screwing is not conventionally effected on a front side of the television tuner 100, there is a need for a construction that provides electric points of contact other than screwing. Concretely, by mounting the metallic grounding spring 140 in the form of a leaf spring between the support surface 112 provided on an upper portion of a front side of the bottom chassis 110 and the top cover 130, the bottom chassis 110 and the top cover 130 are brought into electric contact with each other. Thereby, a shielding effect can be produced on the front side of the television tuner 100. In this manner, with the conventional television tuner 100, conductive screws produce a shielding effect on the sides and the rear surface side and the grounding spring 140 produces a shielding effect on the front side.

However, the television tuner 100, shown in FIG. 13, uses the grounding spring 140 in order to produce the shielding effect, so that there is a problem that the number of parts is increased correspondingly.

Hereupon, in order to solve the above problems, it is conceivable to use other housing structures for an electronic equipment, in which a shielding effect is produced without the use of screws and the grounding spring 140 on the front side of the conventional television tuner 100 (see, for example, JP-A-6-291483 and JP-UM-A-58-155872).

JP-A-6-291483 described above discloses a housing structure for an electronic equipment, provided with an elastic comb-shaped portion that is formed on a peripheral edge of at least one of a conductive chassis receiving therein an electronic circuit and a conductive cover covering the chassis to prevent leakage of electromagnetic wave noise. With the construction disclosed in JP-A-6-291483, a shielding effect is produced by bringing the comb-shaped portion into press contact with the other.

Also, JP-UM-A-58-155872 described above discloses a casing construction for high frequency radio equipment, in which grooves are provided in the vicinity of and along end edges of both sides of a casing chassis and fitting projections are provided on a lid to correspond to the grooves. With the construction disclosed in JP-UM-A-58-155872, a shielding effect can be produced in those portions, in which the projections on the lid and the grooves of the casing chassis fit.

SUMMARY OF THE INVENTION

With the disclosure of JP-A-6-291483, the comb-shaped portion possesses elasticity, so that a pressing force on that portion, which contacts with a cover of the comb-shaped portion, can be relieved to some degree. However, in the case the comb-shaped portion is large in plate thickness, a side in contact with the comb-shaped portion is small in plate thickness and in mechanical strength, there is caused a problem that even if the comb-shaped portion possesses elasticity, a contact surface on the side in contact with the comb-shaped portion is in some cases deformed due to the pressing force applied by the comb-shaped portion.

Also, the construction disclosed in JP-UM-A-58-155872 involves a problem that since the projections on the lid are spread and mounted into the grooves of the casing chassis when the lid is to be mounted on the casing chassis, the lid is possibly deformed in the case where the lid is smaller in plate thickness than the casing chassis.

The invention has been made in order to solve the above problems, and an object of the invention is to provide a television tuner, capable of producing a shielding effect and suppressing deformation of contact portions without an increase in the number of parts, and a housing structure for an electronic equipment.

In order to attain the above object, there is provided in a first aspect of the invention a television tuner, comprising a chassis, which is made of a conductive material and in which a television tuner circuit that radiate electromagnetic wave noise is received, a cover made of a conductive material to be mounted on an upper side of the chassis, and a panel made of an insulating material to be mounted on a front side of the chassis, and wherein the chassis comprises support surfaces formed on an upper portion of a front side of the chassis to be made integral with the chassis and extending with a rising slope in a direction from a front side toward a rear side thereof, a plurality of semi-spherical projections formed integrally on the support surfaces of the chassis with a predetermined spacing therebetween in a longitudinal direction of the support surfaces, and a plurality of substantially U-shaped notches provided on the support surfaces and formed in a manner to partially surround respective peripheries of the semi-spherical projections, and the cover comprises a convex-shaped portion formed integral with the cover in a manner to extend along positions, which correspond to the plurality of semi-spherical projections on the chassis, and to abut against the semi-spherical projections on the chassis, the convex-shaped portion projecting toward the semi-spherical projections to function as a reinforcement rib, and hook-shaped engagements provided on a side of the cover toward the panel to engage with an upper portion of an inner surface of the panel from under, and the hook-shaped engagements engage with the upper portion of the inner surface of the panel from under whereby the convex-shaped portion on the cover abuts against the semi-spherical projections of the chassis with a predetermined push force from above.

With the television tuner in the first aspect of the invention, by configuring the cover to comprise the convex-shaped portion extending along positions, which correspond to the plurality of semi-spherical projections on the chassis, abutting against the semi-spherical projections on the chassis, and functioning as a reinforcement rib, the convex-shaped portion functioning as a reinforcement rib can effectively suppress deformation of the cover caused by a push force of the projections even in the case where the cover has a small thickness. Also, the convex-shaped portion is formed integral with the cover whereby the number of parts is not increased. Also, the plurality of semi-spherical projections are provided on the support surfaces, which are provided on the upper portion of the front side of the chassis, with a predetermined spacing therebetween, the hook-shaped engagements are provided on the cover to engage with the upper portion of the inner surface of the panel from under, and the engagements engage with the upper portion of the inner surface of the panel from under to cause the convex-shaped portion of the cover to abut against the projections on the chassis with a predetermined push force from above, whereby points of electric contact can be surely obtained between the cover and the chassis. Thereby, a shielding effect can be surely produced. Also, the substantially U-shaped notches are provided in a manner to partially surround respective peripheries of the plurality of projections whereby elasticity can be imparted to the projections, so that contact pressure between the projections of the chassis and the cover is inhibited from being excessively increased. Thereby, by combining with the convex-shaped portion functioning as a reinforcement rib, deformation of the cover can be effectively restricted even in the case where the cover has a small thickness.

Also, in the first aspect, the support surfaces formed on the upper portion of the front side of the bottom chassis are formed to extend with a rising slope in the direction from a front side toward a rear side thereof whereby it is possible to inhibit the engagements of the cover from interfering with the support surfaces and the projections of the chassis when the engagements of the cover are to engage with the panel. As a result, it is possible to enhance the work efficiency of an assembling work of engaging the engagements of the cover with the panel. Also, the projections are formed integral with the chassis whereby a shielding effect can be surely produced without an increase in the number of parts.

Provided in a second aspect of the invention is a housing structure for an electronic equipment, comprising a chassis, in which electronic parts that radiate electromagnetic wave noise are received, a cover made of a conductive material to be mounted on an upper side of the chassis, and a panel mounted on a front side of the chassis, and wherein the chassis comprises support surfaces formed on an upper portion of the chassis on a front side thereof to be made integral with the chassis and extending in a direction from a front side toward a rear side thereof, and a plurality of projections formed on the support surfaces with a predetermined spacing therebetween, and the cover comprises a convex-shaped portion formed integral with the cover in a manner to extend along positions, which correspond to the plurality of semi-spherical projections on the chassis, and to abut against the semi-spherical projections on the chassis, the convex-shaped portion projecting toward the semi-spherical projections to function as a reinforcement rib, and engagements provided on a side of the cover toward the panel to engage with an upper portion of an inner surface of the panel from under.

With the housing structure for an electronic equipment, in the second aspect of the invention, by configuring the cover to comprise the convex-shaped portion extending along positions, which correspond to the plurality of semi-spherical projections on the chassis, abutting against the semi-spherical projections on the chassis, and functioning as a reinforcement rib, the convex-shaped portion functioning as a reinforcement rib can effectively suppress deformation of the cover caused by a push force of the projections even in the case where the cover has a small thickness. Also, the convex-shaped portion is formed integral with the cover whereby the number of parts is not increased. Also, the plurality of projections are provided on the support surfaces, which are provided on the upper portion of the front side of the chassis, with a predetermined spacing therebetween, and the engagements are provided on the cover to engage with the upper portion of the inner surface of the panel from under, whereby points of electric contact can be surely obtained between the cover and the chassis. Thereby, a shielding effect can be surely produced.

With the housing structure for an electronic equipment, in the second aspect, the chassis preferably comprises a plurality of U-shaped notches formed in a manner to partially surround respective peripheries of the plurality of projections. With such construction, elasticity can be imparted to the projections, so that contact pressure between the projections of the chassis and the cover is inhibited from being excessively increased. Thereby, by combining with the convex-shaped portion functioning as a reinforcement rib, deformation of the cover can be effectively restricted even in the case where the cover has a small thickness.

With the housing structure for an electronic equipment, in the second aspect, the support surfaces preferably comprises a rising slope in a direction from a front side toward a rear side thereof. With such construction, it is possible to inhibit the engagements of the cover from interfering with the support surfaces and the projections of the chassis when the engagements of the cover are caused to engage with the panel. As a result, it is possible to enhance the work efficiency of an assembling work of engaging the engagements of the cover with the panel.

With the housing structure for an electronic equipment, in the second aspect, the projections are preferably semi-spherical in shape and provided integrally on the support surfaces of the chassis. With such construction, a shielding effect can be surely produced without an increase in the number of parts.

DETAILED DESCRIPTION OF THE PREFERRED EMBODIMENTS

Embodiments of the invention will be described below with reference to the drawings.

Figure 1:
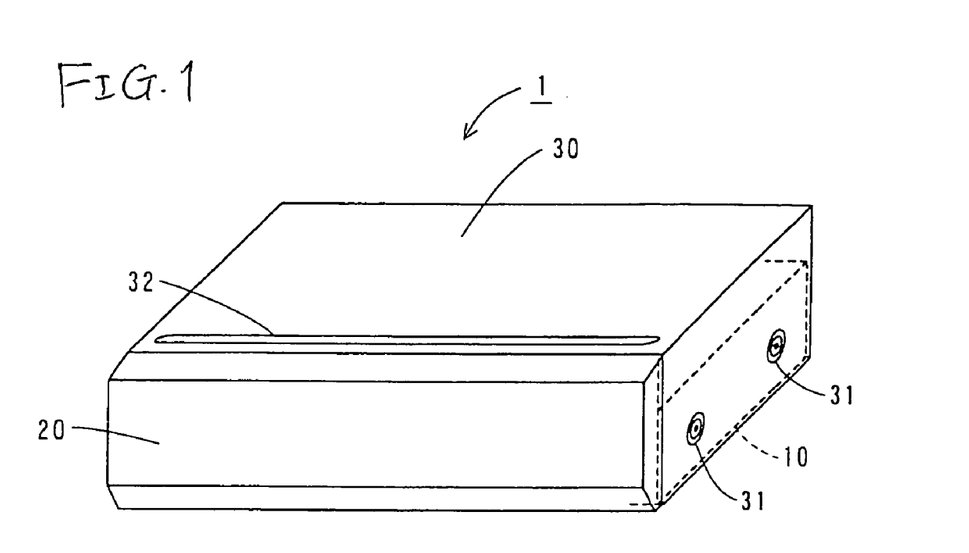
FIG. 1 is a perspective view showing a television tuner, according to an embodiment of the invention.
Figure 2:
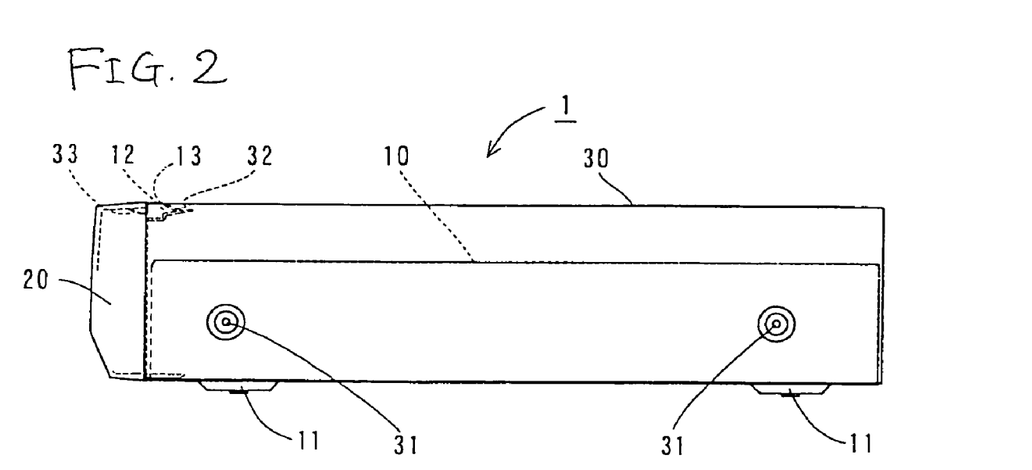
FIG. 2 is a side view showing the television tuner according to the embodiment of the invention shown in FIG. 1.
Figure 3:
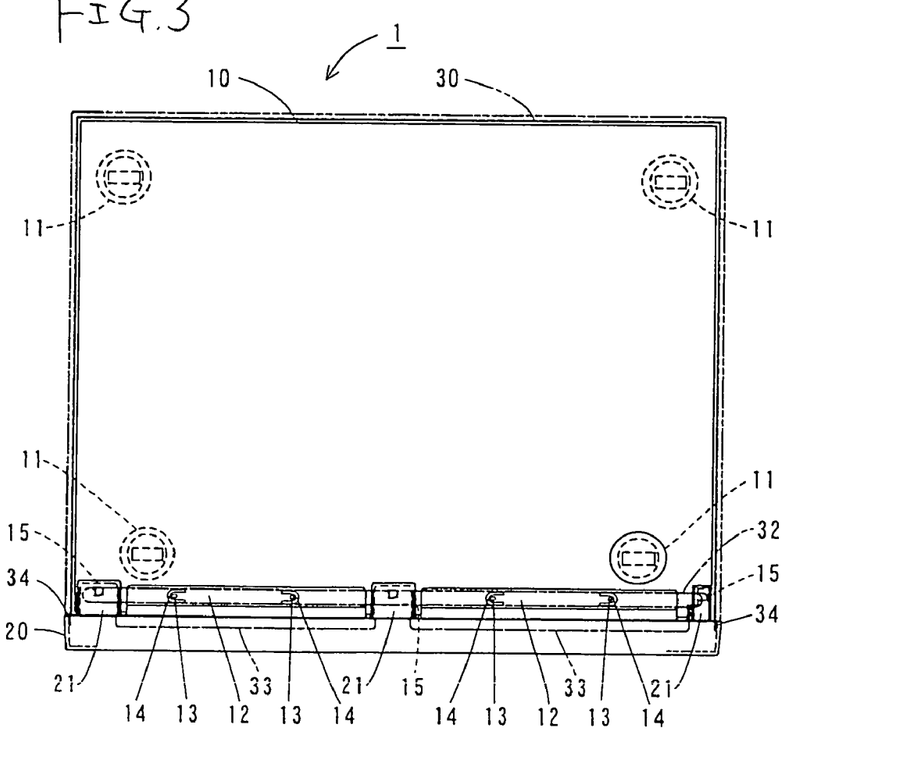
FIG. 3 is a plan view showing the television tuner according to the embodiment of the invention.
Figure 4:
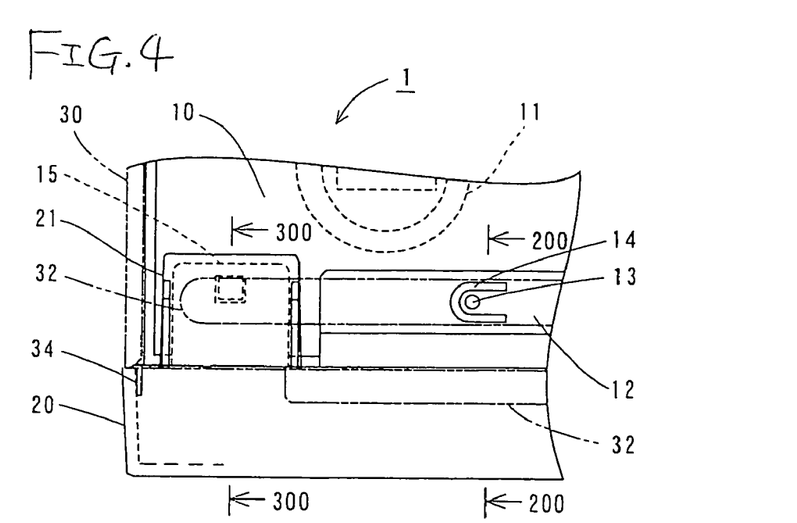
FIG. 4 is a partial enlarged view of FIG. 3.
Figure 5:
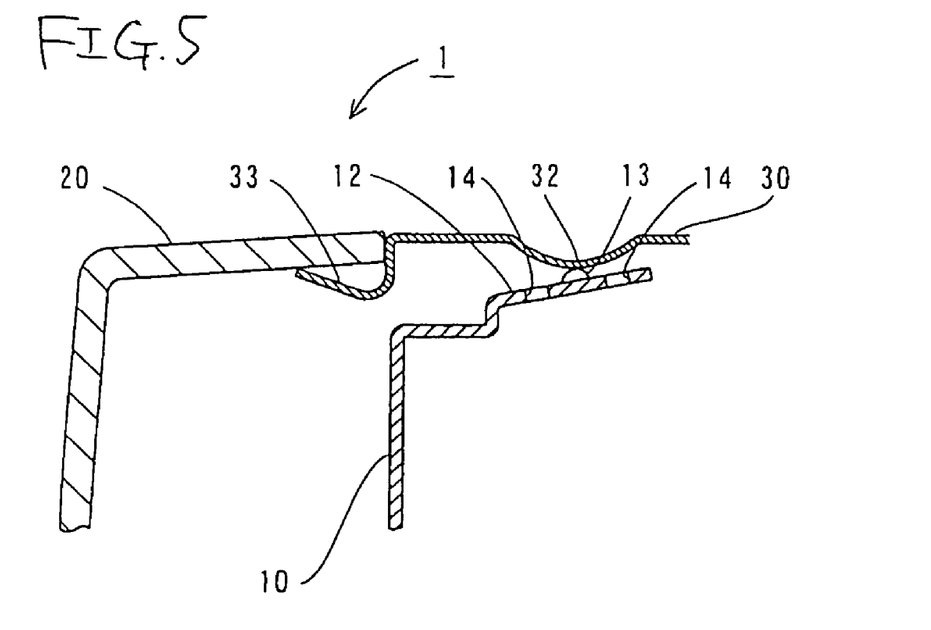
FIG. 5 is a partial cross sectional view taken along line 200—200 and showing the television tuner according to the embodiment of the invention shown in FIG. 4.
Figure 6:
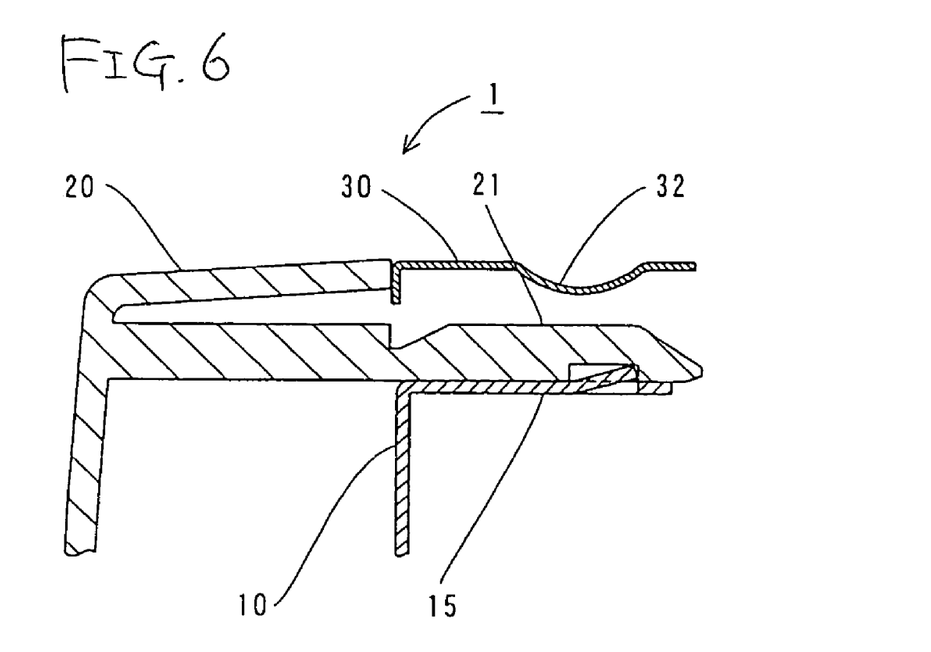
FIG. 6 is a partial cross sectional view taken along line 300—300 and showing the television tuner according to the embodiment of the invention shown in FIG. 4.
Figure 7:
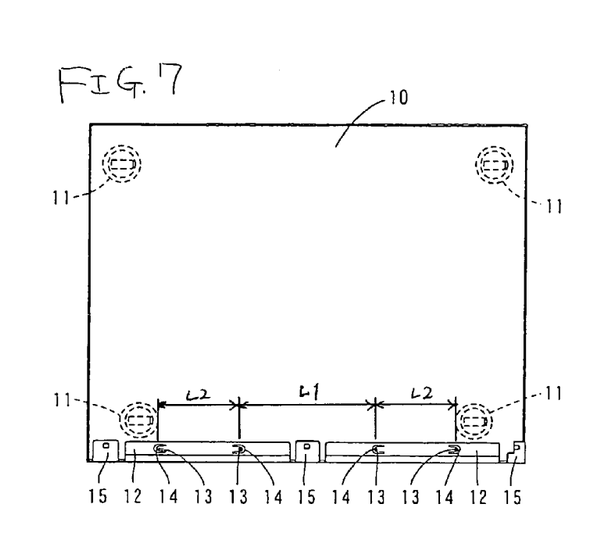
FIG. 7 is a plan view showing a bottom chassis of the television tuner according to the embodiment of the invention shown in FIG. 1.
Figure 8A:
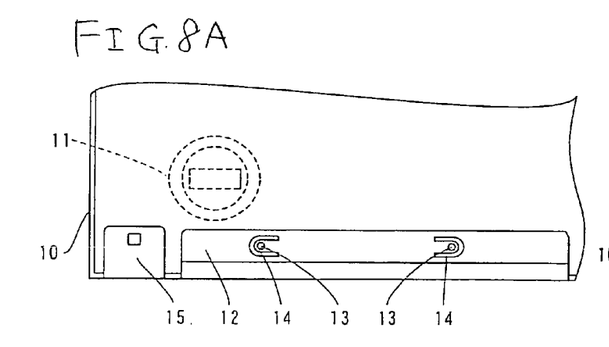
FIG. 8A is a partial enlarged view of FIG. 7.
Figure 9:
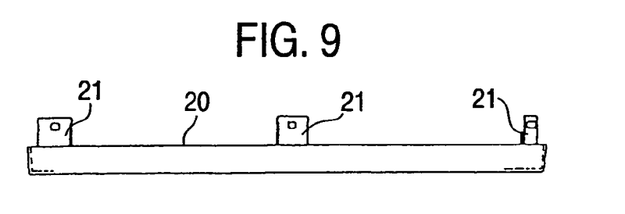
FIG. 9 is a plan view showing a front panel of the television tuner according to the embodiment of the invention shown in FIG. 1.
Figure 10:
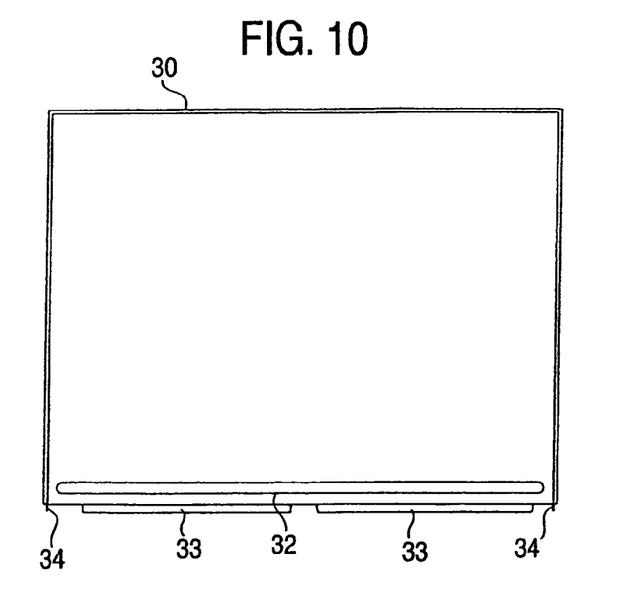
FIG. 10 is a plan view showing a top cover of the television tuner according to the embodiment of the invention shown in FIG. 1.

FIG. 1 is a perspective view showing a television tuner, according to an embodiment of the invention. FIG. 2 is a side view showing the television tuner, according to the embodiment of the invention, shown in FIG. 1. FIG. 3 is a plan view showing the television tuner, according to the embodiment of the invention. FIG. 4 is a fragmentary, enlarged view of FIG. 3. FIG. 5 is a fragmentary, cross sectional view taken along line 200—200 and showing the television tuner, according to the embodiment of the invention, shown in FIG. 4. FIG. 6 is a fragmentary, cross sectional view taken along line 300—300 and showing the television tuner, according to the embodiment of the invention, shown in FIG. 4. FIG. 7 is a plan view showing a bottom chassis of the television tuner, according to the embodiment of the invention, shown in FIG. 1. FIG. 8A is a fragmentary, enlarged view of FIG. 7. FIG. 9 is a plan view showing a front panel of the television tuner, according to the embodiment of the invention, shown in FIG. 1. FIG. 10 is a plan view showing a top cover of the television tuner, according to the embodiment of the invention, shown in FIG. 1.

First, a construction of a television tuner 1, according to an embodiment of the invention, will be described with reference to FIGS. 1 to 10. The television tuner 1, according to the embodiment of the invention, comprises, as shown in FIGS. 1 and 2, a metallic bottom chassis 10, in which a television tuner circuit (not shown) that radiate electromagnetic wave noise is received, a front panel 20 made of a resin and mounted to a front side of the bottom chassis 10, and a metallic top cover 30 mounted to an upper side of the bottom chassis 10. In addition, the bottom chassis 10 is an example of "chassis" in the invention. Also, the front panel 20 is an example of "panel" in the invention. Also, the top cover 30 is an example of "cover" in the invention.

The bottom chassis 10 is formed integrally from a single metallic sheet. The bottom chassis 10 comprises, as shown in FIGS. 7 and 8, legs 11, support surfaces 12, projections 13, notches 14, and front panel engaging portions 15. The legs 11 are provided on an underside of the bottom chassis 10 as shown in FIG. 2. Also, the two support surfaces 12 are provided on an upper portion of a front side of the bottom chassis 10 as shown in FIGS. 3, 4, 7, and 8. The two support surfaces 12 comprise a rising slope in a direction from a front surface of the television tuner 1 toward a rear side thereof. Also, the projections 13 are provided two to each of the two support surfaces 12 with a predetermined spacing therebetween in a longitudinal direction. The projections 13 are semi-spherical in shape.

Here, according to the embodiment, substantially U-shaped notches 14 are formed in a manner to surround peripheries of the semi-spherical projections 13 on the support surfaces 12 as shown in FIGS. 7 and 8. Thereby, the projections 13 are configured to posses elasticity.

The interval L1 between the two semi-spherical projections 13, 13 on the center side is set to be larger than the interval L2 between the semi-spherical projection 13 on one side and the adjacent semi-spherical projection on the center side.

Also, the front-panel engaging portions 15 are provided on the upper portion of the front side of the bottom chassis 10 as shown in FIGS. 6 to 8. The front-panel engaging portions 15 are provided in order to engage with the front panel 20 when the front panel 20 is to be mounted.

The front panel 20 is mounted on the front side of the bottom chassis 10 as shown in FIGS. 1 and 2. The front panel 20 comprises, as shown in FIG. 9, bottom-chassis engaging portions 21 formed integral with the front panel 20. The bottom-chassis engaging portions 21 on the front panel 20 engage with the front-panel engaging portions 15 on the bottom chassis 10 as shown in FIGS. 3, 4, and 6.

Also, the top cover 30 is mounted to an upper side of the bottom chassis 10 as shown in FIGS. 1 and 2. The top cover 30 comprises, as shown in FIG. 1, screwing portions 31, a convex-shaped portion 32, hook-shaped engagements 33, and side engagements 34. The screwing portions 31 are provided on sides of and a rear surface of the top cover 30 as shown in FIGS. 1 and 2. The bottom chassis 10 and the top cover 30 are screwed to each other via the screwing portions 31 by means of conductive screws.

Here, according to the embodiment, the convex-shaped portion 32 functions as a reinforcement rib for the top cover 30. The convex-shaped portion 32 functioning as a reinforcement rib is formed integral with the top cover 30 in a manner to extend along positions that correspond to the semi-spherical projections 13 on the bottom chassis 10 as shown in FIGS. 3 to 5. Also, the convex-shaped portion 32 projects toward the semi-spherical projections 13 on the bottom chassis 10 as shown in FIG. 5.

Also, as shown in FIG. 3, the hook-shaped engagements 33 are provided two in number in a manner to project toward the front panel 20 of the top cover 30. Also, the side engagements 34 are provided on the sides of the top cover 30 toward the front panel 20. The side engagements 34 engage with inner sides of the top cover 30 as shown in FIGS. 3 and 4.

Also, according to the embodiment, when the top cover 30 is to be mounted on an upper side of the bottom chassis 10, the two hook-shaped engagements 33 of the top cover 30 are caused to engage with an upper portion of an inner surface of the front panel 20 from under. Then, the convex-shaped portion 32 functioning as a reinforcement rib for the top cover 30 is caused with a predetermined push force to abut against the four semi-spherical elastic projections 13 on the bottom chassis 10 from above. Thereby, the bottom chassis 10 and the top cover 30 are configured to have four points of electric contact on that front side of the television tuner 1, on which screwing is not effected.

According to the embodiment, by providing the convex-shaped portion 32, which abuts against the semi-spherical projections 13 on the bottom chassis 10 and functions as a reinforcement rib, on the top cover 30, the convex-shaped portion 32 functioning as a reinforcement rib also in the case where the top cover 30 has a small thickness can effectively suppress deformation of the top cover 30 caused by a push force of the projections 13. Also, the convex-shaped portion 32 is formed integral with the top cover 30 whereby the number of parts is not increased.

Also, according to the embodiment, the semi-spherical projections 13 are provided on the support surfaces 12, which are provided on the upper portion on the front side of the bottom chassis 10, with a predetermined spacing therebetween, the hook-shaped engagements 33 are provided on the top cover 30 to engage with the upper portion of the inner surface of the front panel 20 from under, and the engagements 33 engage with the upper portion of the inner surface of the front panel 20 from under to cause the convex-shaped portion 32 of the top cover 30 to abut against the projections 13 on the bottom chassis 10 with a predetermined push force from above, whereby points of electric contact can be surely obtained between the top cover 30 and the bottom chassis 10. Thereby, it is possible to surely produce a shielding effect. Also, the substantially U-shaped notches 14 are provided in a manner to partially surround respective peripheries of the plurality of projections 13 whereby elasticity can be imparted to the projections 13, so that contact pressure between the projections 13 of the bottom chassis 10 and the top cover 30 is inhibited from being excessively increased. Thereby, a combination of the convex-shaped portion 32 functioning as a reinforcement rib and the notches 14 makes it possible to effectively restrict deformation of the top cover 30 even in the case where the top cover 30 has a small thickness.

Also, according to the embodiment, the support surfaces 12 formed on the upper portion of the front side of the bottom chassis 10 are formed to extend with a rising slope in the direction from a front side toward a rear side thereof whereby it is possible to inhibit the engagements 33 of the top cover 30 from interfering with the support surfaces 12 and the projections 13 of the bottom chassis 10 when the engagements 33 of the top cover 30 are caused to engage with the front panel 20. As a result, it is possible to enhance the work efficiency of an assembling work of engaging the engagements 33 of the top cover 30 with the front panel 20.

Also, according to the embodiment, the projections 13 are formed integral with the bottom chassis 10 whereby a shielding effect can be surely produced without an increase in the number of parts.

In addition, it should be thought that the embodiment disclosed herein is illustrative in all respects and not limitative. The scope of the invention is indicated not by the description of the embodiment but by the claims, and covers all modifications in the meaning equivalent to and the scope of the claims.

For example, while the embodiment illustrates an example of application of the invention to a television tuner, in which a television tuner circuit that radiate electromagnetic wave noise is received, the invention is not limited thereto but the same effect can be produced even when the invention is applied to other housing structures for other electronic equipment, in which other electronic parts to radiate electromagnetic wave noise are received.

Also, while according to the embodiment, notches are provided one to each of all the projections provided on the support surfaces of the bottom chassis, the invention is not limited thereto but notches may be provided one to a plurality of projections. Also, any notches may not be provided.

Also, while according to the embodiment, the projections are formed to be semi-spherical in shape, the invention is not limited thereto but the projections may be shaped in a different manner from the semi-spherical shape.

Figure 8B:
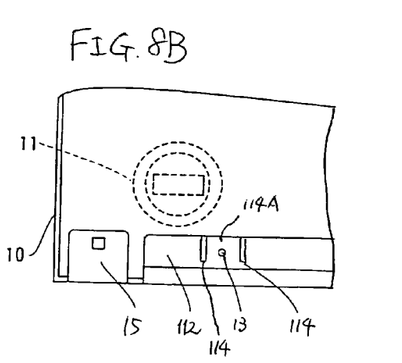
FIG. 8B shows a modified example.

As shown in FIG. 8B, a support surface 112 may have two slits 114 extending in a front-to-rear direction and interposing a support piece 114A therebetween. The semi-spherical projection 13 may be provided on the support piece 114A. Without providing the semi-spherical projection 13, the support piece 114A itself may serve as the projection.

What is claimed is:

1. A housing structure for electronic equipment, comprising:
   a chassis, in which electronic parts that radiate electromagnetic wave noise are received;
   a cover made of a conductive material to be mounted on an upper side of the chassis; and
   a panel mounted on a front side of the chassis;
   wherein the chassis comprises:
     a bottom surface;
     support surfaces formed on an upper portion of a front side of the chassis to be made integral with the chassis and extending in a direction from the front side toward a rear side thereof, the support surfaces opposing the bottom surface with a gap therebetween; and
     a plurality of projections formed on the support surfaces with a predetermined spacing therebetween; and
   the cover comprises:
     a convex-shaped portion formed integrally with the cover in a manner to extend along positions which correspond to the plurality of projections on the chassis, and to abut against the projections on the chassis, the convex-shaped portion projecting toward the projections to function as a reinforcement rib; and
   engagements provided on a side of the panel of the cover to engage with an upper portion of an inner surface of the panel from under.

2. The housing structure for electronic equipment according to claim 1, wherein the chassis comprises a plurality of notches formed in a manner to partially surround respective peripheries of the plurality of projections.

3. The housing structure for electronic equipment according to claim 1, wherein the support surfaces comprise a rising slope in a direction from a front side toward a rear side thereof.

4. The housing structure for electronic equipment according to claim 1, wherein the projections are semi-spherical in shape and provided integrally on the support surfaces of the chassis.

5. The housing structure for electronic equipment according to claim 1, wherein the chassis comprises a plurality of slits, and the respective projections are located between the slits.

* * * * *